United States Patent
Miyazaki et al.

(10) Patent No.: US 7,238,271 B2
(45) Date of Patent: Jul. 3, 2007

(54) METHOD FOR TREATING ORGANIC WASTEWATER CONTAINING AMINOPOLYCARBOXYLIC ACID

(75) Inventors: Hideo Miyazaki, Kanagawa (JP); Ryuichi Ozawa, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 293 days.

(21) Appl. No.: 10/644,044

(22) Filed: Aug. 20, 2003

(65) Prior Publication Data

US 2005/0098498 A1 May 12, 2005

(30) Foreign Application Priority Data

Aug. 21, 2002 (JP) ............................ P. 2002-240608
Jul. 7, 2003 (JP) ............................ P. 2003-271386

(51) Int. Cl.
*C02F 1/46* (2006.01)

(52) U.S. Cl. ................... 205/688; 205/742; 210/631; 210/748

(58) Field of Classification Search ................ 205/688, 205/742; 210/631, 748

See application file for complete search history.

(56) References Cited

U.S. PATENT DOCUMENTS

| | | | |
|---|---|---|---|
| 4,155,810 A | | 5/1979 | Kitajima et al. |
| 5,245,111 A | | 9/1993 | Betz |
| 5,296,111 A | * | 3/1994 | Suzuki et al. ............... 210/611 |
| 5,534,148 A | | 7/1996 | Suzuki et al. |
| 5,575,915 A | | 11/1996 | Nakamura et al. |
| 5,770,093 A | | 6/1998 | Shiota et al. |
| 5,894,077 A | | 4/1999 | Jones et al. |
| 6,780,306 B2 | * | 8/2004 | Schlager et al. ............ 205/701 |
| 2001/0022290 A1 | | 9/2001 | Shiota et al. |
| 2005/0098498 A1 | | 5/2005 | Miyazaki et al. |

FOREIGN PATENT DOCUMENTS

| | | |
|---|---|---|
| DE | 100 15 209 A1 | 10/2001 |
| EP | 0 861 810 A2 | 9/1998 |
| JP | 59-042094 A | 3/1984 |
| JP | 63-116796 A | 5/1988 |
| JP | 03-262594 A | 11/1991 |
| JP | 04-235786 A | 8/1992 |
| JP | 04-244299 A | 9/1992 |
| JP | 05-096298 A | 4/1993 |
| JP | 06-320184 A | 11/1994 |
| JP | 07-047347 A | 2/1995 |
| JP | 07-299467 A | 11/1995 |
| JP | 07-323290 A | 12/1995 |
| JP | 8-281272 A | 10/1996 |
| JP | 08-296081 A | 11/1996 |
| JP | 09-234475 A | 9/1997 |

* cited by examiner

*Primary Examiner*—Arun S. Phasge
(74) *Attorney, Agent, or Firm*—Birch, Stewart, Kolasch & Birch, LLP

(57) ABSTRACT

The present invention provides a method for treating a wastewater which enables one to treat a difficultly biodegradable wastewater, particularly an organic wastewater containing aminopolycarboxylic acids to substantially decrease COD at a low cost, in which the method for treating an organic wastewater containing aminopolycarboxylic acids, comprising subjecting the organic wastewater containing aminopolycarboxylic acids to a high-speed electrolytic oxidation treatment, particularly, a method for treating an organic wastewater which comprises conducting treatment with microorganism subsequent to the high-speed electrolytic oxidation treatment.

18 Claims, No Drawings

METHOD FOR TREATING ORGANIC WASTEWATER CONTAINING AMINOPOLYCARBOXYLIC ACID

This nonprovisional application claims priority under 35 U.S.C. § 119(a) on Patent Application Nos. 2002-240608 and 2003-271386 filed in Japan on Aug. 21, 2002 and Jul. 7, 2003, respectively, which are herein incorporated by reference.

FIELD OF THE INVENTION

The present invention is a method for treating an organic wastewater containing, particularly, an aminopolycarboxylic acid by employing an electrolytic treatment and, particularly, a method of treating an organic wastewater containing, particularly, an aminopolycarboxylic acid by employing both an electrolytic treatment and a treatment with a microorganism. More particularly, it relates to a method for treating a wastewater to remove a difficultly biodegradable aminopolycarboxylic acid from an industrial wastewater such as a wastewater of chemical plating.

BACKGROUND OF THE INVENTION

Difficultly biodegradable chelating agents, particularly aminopolycarboxylic acids, are being popularly used in various fields such as industrial soaps, the photographic industry, the pulp industry and the plating industry. It has been pointed out that, in addition to the difficultly biodegradable properties, the chelating agents contained in the industrial wastewater discharged from these fields might possibly enter into surface layer water, specifically rivers, and ground water. For example, in Germany, discharge of the difficultly biodegradable chelating agents of aminopolycarboxylic acids is self-imposed. In Japan, there exist at present no regulations on use and discharge of them but, since the difficultly biodegradable aminopolycarboxylic acids increase the COD value of a wastewater, the COD value of the wastewater containing the difficultly biodegradable aminopolycarboxylic acids has become problematical in view of regulation of COD.

As methods for treating difficultly biodegradable wastewater such as a wastewater containing an aminopolycarboxylic acid for reducing a COD load of the wastewater, there have conventionally been known a chemically treating method (JP-B-57-37396, JP-A-61-241746, etc.), a reverse osmosis method (JP-A-50-22463), an activated sludge method (JP-B-55-49559, JP-B-51-12943, etc.), an electrolytic oxidation method (JP-A-48-84462, JP-A-49-119458, etc.), etc. However, these methods respectively have the following defects.

As the chemically treating method, there have been known treating methods by adding hydrogen peroxide, persulfates, perhalogenates, chlorous acid, or hypochlorous acid. For wastewaters having a high COD (chemical oxygen demand) value, however, all of the methods show such a poor treating efficiency that chemicals are used always in amounts more than is necessary, leading to a high operation cost. In the case of using a membrane as with the reverse osmosis method, the membrane must be exchanged so frequently due to adsorption of the components in the wastewater or due to dirt that the operation cost is liable to become high.

As to the activated sludge method, its operation cost is inexpensive, but its effect on materials having a poor biodegradability is low. Particularly, it is almost ineffective for treating a wastewater containing an aminopolycarboxylic acid such as EDTA (ethylenediaminetetraacetic acid).

Although the electrolytic oxidation method shows a strong oxidation power, it involves such problems as (1) that oxidative decomposition treatment of a waste liquor having a high COD value requires a large electric current and a high cost of equipment and takes a prolonged treating time and (2) that decomposition of organic compounds often stops at a level of lower fatty acids such as propionic acid which have a load of BOD (biological oxygen demand), leading to an insufficient decrease of the BOD value.

There have been disclosed methods of carrying out electrolytic oxidation under high-speed agitation as means to further enhance the effect of electrolytic oxidation; for example, in JP-A-8-281272 is set forth a wastewater-treating apparatus to which high-speed electrolysis is applied, in JP-A-9-40482 is set forth a method of obtaining an aqueous manure solution from the effluent from electroless plating and an apparatus for such method, and in WO 02/090621 is set forth a method of electrolytically treating wastewater in continuous mode and an apparatus for such method. However, no one of these disclosed patent literatures contains any description on the treatment of aminopolycarboxylic acid, and in addition the preferable pH range is adjusted not to exceed 6.

It is also possible to conduct the treatment of wastewater according to an ozone decomposition method, but its large cost is a bottleneck.

These difficultly biodegradable compounds are scarcely decomposed by the conventional activated sludge treatment, and the alternative methods are not effective as described hereinbefore. Hence, a dilution method of diluting a wastewater before its discharge is the most general method for decreasing the COD value to a regulation level or lower. However, the dilution method is costly and fails to reduce the total amount of discharged COD. Thus, there has been desired an essentially problem-solving means of substantially decreasing COD in the discharged water.

SUMMARY OF THE INVENTION

The invention is made with the above-described background, and its object is to provide a method of treating a wastewater containing an aminopolycarboxylic acid, which is a typical wastewater among the above-described difficultly biodegradable wastewaters, for substantially decreasing COD of the wastewater at a low treating cost.

As a result of intensive investigations to solve the above-described problems, the inventor has found that the problems can be solved by the following methods. That is, the invention is as follows.

1. A method for treating an organic wastewater containing an aminopolycarboxylic acid, which comprises subjecting the organic wastewater to a high-speed electrolytic oxidation treatment.

2. The method for treating an organic wastewater containing an aminopolycarboxylic acid as described in the item 1, wherein the high-speed electrolytic oxidation treatment is conducted by vibrating a vibrating plate dipped in the organic wastewater to thereby stir the organic wastewater at a high speed.

3. The method for treating an organic wastewater containing an aminopolycarboxylic acid as described in the item 2, wherein the vibrating plate is a composite vibrating plate constituted by arranging a plurality of vibrating plate units.

4. The method for treating an organic wastewater containing an aminopolycarboxylic acid as described in the item 2 or 3, wherein the vibrating plate has a frequency of 10 cycle/sec to 100 cycle/sec.

5. The method for treating an organic wastewater containing an aminopolycarboxylic acid as described in any one of the items 1 to 4, which comprises adjusting the pH of the organic wastewater at 6.5 to 11.0 to subject the adjusted organic wastewater to the high-speed electrolytic oxidation treatment.

6. The method for treating an organic wastewater containing an aminopolycarboxylic acid as described in any one of the items 1 to 5, wherein the organic wastewater having been subjected to the high-speed electrolytic oxidation treatment is further subjected to a treatment with a microorganism.

7. The method for treating an organic wastewater containing an aminopolycarboxylic acid as described in the item 6, wherein the microorganism is a microorganism capable of decomposing a difficultly biodegradable compound.

8. The method for treating an organic wastewater containing an aminopolycarboxylic acid as described in the item 6 or 7, wherein the organic wastewater having been subjected to the high-speed electrolytic oxidation treatment has an aminopolycarboxylic acid in an amount of 1.5 mmol/L or less, and is further subjected to the treatment with a microorganism.

9. The method for treating an organic wastewater containing an aminopolycarboxylic acid as described in any one of the items 6 to 8, wherein the microorganism is supported on a carrier.

10. The method for treating an organic wastewater containing an aminopolycarboxylic acid as described in any one of the items 1 to 9, wherein the aminopolycarboxylic acid is present in form of an organic aminocarboxylic acid chelate with a metal ion.

11. The method for treating an organic wastewater containing an aminopolycarboxylic acid as described in any one of the items 1 to 10, wherein the aminopolycarboxylic acid is at least one selected from the group consisting of ethylenediaminetetraacetic acid (EDTA), 1,3-propylenediaminetetraacetic acid (PDTA) and diethylenetriaminepentaacetic acid (DTPA).

12. The method for treating an organic wastewater containing an aminopolycarboxylic acid as described in any one of the items 1 to 11, wherein the organic wastewater is an industrial wastewater discharged from the paper pulp industry, the photographic industry, the textile industry, the plating industry or the cosmetic industry, or an agricultural wastewater.

13. The method for treating an organic wastewater containing an aminopolycarboxylic acid as described in any one of the items 1 to 12, wherein the organic wastewater containing an aminopolycarboxylic acid is a wastewater of electrolytic plating or non-electrolytic plating.

A first aspect of the invention described above is that it enables one to conduct a COD-reducing treatment of an organic wastewater containing an aminopolycarboxylic acid, whose COD value has not been reduced to an enough low level by the conventional electrolytic oxidation treatment alone even when conducted for a long time, with a high efficiency and a high oxidation speed not having been obtained by the conventional electrolytic oxidation treatment alone.

A second aspect of the invention is that the above-described high-speed electrolytic oxidation treatment is combined with a treatment with a microorganism, whereby a much higher oxidation speed and a higher treating efficiency of the COD-reducing treatment are realized. In this combined treatment, a particularly large COD-reducing effect is obtained in the case where the treatment with an microorganism is a treatment with a microorganism that can decompose difficultly biodegradable compounds, thus such treatment being effective.

The invention is now described in more detail by reference to embodiments.

DETAILED DESCRIPTION OF THE INVENTION (Organic Wastewater Containing an Aminopolycarboxylic Acid)

The organic wastewater to be treated by the method of the invention contains an aminopolycarboxylic acid which is a difficultly biodegradable compound as is described hereinbefore, that is, a compound scarcely decomposable by the conventional activated sludge. The difficultly biodegradable compound specifically means a compound which shows a biodegradation ratio of 50% or less when subjected to a biodegradation test according to the MITI method.

The organic wastewater to be treated by the method of the invention which contains an aminopolycarboxylic acid is a wastewater which contains the aminopolycarboxylic acid at such a level that it cannot be discharged as such. Specifically, it is an industrial wastewater containing an organic aminopolycarboxylic acid such as EDTA (ethylenediaminetetreaacetic acid), DTPA (diethylenetriaminepentaacetic acid) or PDTA (1,3-propenediaminetetraacetic acid). The term "aminopolycarboxylic acid" includes all forms of the aminopolycarboxylic acid such as a free acid, a water-soluble salt with a metal (e.g., an alkali metal salt, an ammonium salt, an alkaline earth metal salt and a metal complex (metal chelate) wherein a complex bond or bonds are formed with a heavy metal.

Examples of the wastewater containing these aminopolycarboxylic acids include a wastewater discharged from photographic processing, a wastewater containing a difficultly biodegradable chelating agent discharged from fascilities of the pulp industry or the plating industry and, in particular, wastewater from chemical plating, wastewater discharged from facilities handling industrial detergents and domestic detergents and washing wastewater from the food industry. In the invention, however, the wastewater is not limited to these, and the invention may be effectively applied to any wastewater that contains difficultly biodegradable organic compounds such as an aminopolycarboxyolic acid at such a high level that it cannot be directly discharged.

The COD value of such organic wastewater exceeds the regionally regulated discharge level and, in many cases, ranges from 20 ppm to several ten thousands of ppm, with ranging from about 100 to about 1000 ppm in more cases.

(High-speed Electrolytic Oxidation Treatment)

The high-speed electrolytic oxidation treatment characteristically employed in the method of the invention of treating a wastewater is described below. The high-speed electrolytic oxidation treatment to be used in the invention is preferably a treatment of conducting electrolytic oxidation by using a stirring apparatus equipped with a vibrating plate and vibrating the vibrating plate in an electrolytic solution (i.e., an organic wastewater containing an aminopolycarboxylic acid) placed in the apparatus. An extremely high electrolytic oxidation speed and an extremely high COD-reducing effect can be obtained by properly selecting the vibration frequency of the vibrating plate.

The pH of the solution to be treated is from 6.5 to 11.0, preferably from 7.0 to 10.5, and more preferably from 7.5 to 10.0. During the electrolytic treatment, the pH should preferably be regulated to lie within the above-cited range with use of a pH-stat.

The stirring apparatus to be preferably used in the invention is an apparatus wherein the vibrating plate is connected to an electric motor to convert rotation of the electric motor to vibration of the vibrating plate which serves to stir the electrolytic solution in the apparatus. The vibration frequency is 10 cycles/sec to 100 cycles/sec, preferably 15 cycles/sec to 80 cycles/sec, more preferably 20 cycles/sec to 60 cycles/sec.

Also, the preferred stirring apparatus has at least one vibrating plate and, preferably, has a constitution wherein a plurality of vibrating plates are arranged. In the case where the stirring apparatus has a plurality of vibrating plates, the vibrating plates are preferably arranged in a line so that the faces of the plates exist in one plane, in a multi-layered form so that the vibrating plates are superposed one over the other in parallel in a direction at right angles to the plate face direction, or in an obliquely multi-layered form so that the plates are superposed one over the other in parallel with each other and that the direction of the plate face obliquely crosses with the superposing direction. In any arrangement, the vibrating plates are arranged with a definite gap therebetween so as to secure a liquid flow between the plates. The gap is 1 to 200 mm, preferably 2 to 150 mm, more preferably 3 to 100 mm.

The shape of the vibrating plate may be any of a rectangular shape, an elliptical shape, a trapezoidal shape, a square shape, and a rectangular or square shape whose edges are rounded, with a rectangular shape, a square shape or a rectangular or square shape whose edges are rounded being preferred. The size of the vibrating plate may properly be selected depending upon the size of the electrolytic oxidation tank. As a guide, the area of one side of the vibrating plate is $1/1000$ to $1/5$, preferably $1/50$ to $1/5$, of the cross-sectional area of the electrolytic oxidation tank. Where the vibration plate is a metal plate, the thickness is $1/100$ to $1/5$, preferably $1/10$ to $1/20$, of the length of a longer side (longer diameter) and, where the vibration plate is a resin plate, the thickness is $1/50$ to $1/5$, preferably $1/20$ to $1/10$.

The vibrating apparatus is constituted by one electric motor and one vibrating plate, or one electric motor and a set of vibrating plates, and may be constituted by one electric motor and plural (preferably two) sets of the vibrating plates.

The vibrating plate is made of a material not corrodible in the electrolytic oxidation step for the organic wastewater containing the aminopolycarboxylic acid. Preferred examples of such material include metals such as various stainless steels, titanium alloys and iron or these metals covered with a resin, and cross-linked resins such as acrylic resins, polycarbonate resins, phenol resins, polyamide resins and vinyl chloride resins, with metal plates being more preferred.

The reason why the above-specified high-speed electrolytic oxidation apparatus serves to decompose the aminopolycarboxylic acid contained in a wastewater in a short time with a high efficiency, whose decomposition has conventionally required a prolonged period of time and has been conducted only with an insufficient decomposition ratio, is not fully clarified yet, but may be considered as follows. That is, in the conventional electrolytic oxidation, a highly efficient stirring is not effected in the vicinity of the electrode surfaces, and the electrolytic reaction does not proceed rapidly whereas, in the method of the invention, the strong stirring means causes a turbulent flow in the vicinity of the electrode surfaces to reduce the thickness of boundary film and markedly enhance the reaction rate.

A preferred high-speed electrolytic oxidation apparatus to be used in the invention is characterized in the highly efficient stirring by the above-described vibrating plate. However, as to other aspects than the stirring mechanism, those in the conventionally used general-purpose electrolytic oxidation apparatus may be used.

As the electrodes, any of noble electrodes that are not worn even when anodic oxidation is continuously carried out may be used with no limitations, but those electrodes which are enough noble to be difficultly oxidized being preferred. Specifically, those prepared by covering the surface of a titanium substrate with lead dioxide, platinum or platinum-iridium (for example, Exeroad (trade name); made by Japan Carlit Co., Ltd.) are preferred. These anodes permit application of such a high voltage that alcohols, aldehydes and carboxylic acids can be electrolytically oxidized with a high efficiency. A voltage of 2 to 10 V, preferably 2 to 8 V, is applied to one pair of electrodes.

On the other hand, as a cathode, any one that has an enough corrosion resistance not to suffer corrosion during suspension of the electrolytic oxidation and has an enough high ability to transmit electric current may be used. However, a stainless steel plate (or rod) is most preferred. Of course, various kinds of carbon electrodes and various kinds of metal electrodes may be used as well. As to the structure of a pair of anode-cathode pairs, there may be employed a proper structure such as that wherein the electrodes are alternately placed in a face-to-face arrangement with a proper gap therebetween, or a sandwich structure wherein an anode is sandwiched between two cathodes or a cathode is sandwiched between two anodes. Here, the form of the electrode may be any of a linear form, a platy form, a net-like form, a cloth-like form or a spherical form, but those which have a larger surface area are more preferred.

The electrolysis tank may be of a continuous type or a batchwise type. Further, a metal or a metal compound may be added as an electrolysis catalyst.

The quantity of electricity applied is the product of electric current and time, and is controlled to 0.1 to 1,000 times, preferably 0.5 to 100 times, the COD equivalent. The term "COD equivalent" as used herein means a value double the product of the quotient of COD value divided by atomic weight of oxygen and the Faraday constant.

Any high-speed electrolytic oxidation apparatus that satisfies the above-mentioned requirements may be used for the process of the invention of treating an organic wastewater. As a preferably applicable apparatus, there may be illustrated an ultra-high-speed electrolytic oxidation apparatus, BC nine, made by Nihon Tekuno K.K.

(Treatment with Microorganism)

In the method of the invention of treating an organic wastewater employing the high-speed electrolytic oxidation treatment, much more enhanced effects of decomposing aminopolycarboxylic acids and reducing COD, which are the objects of the invention, can be obtained by further conducting treatment with a microorganism. Hence, this treatment with a microorganism is now described below.

In the description of the specification of the invention, the terms "biodegradation", "difficultly biodegradable", and "microorganism which can decompose difficultly biodegradable compounds such as an aminopolycarboxylic acid"

are sometimes merely referred to as "decomposition", "difficultly degradable" and "specific microorganism", respectively. Also, in places where descriptions are made in view of biological treatment, "microorganism" which conducts decomposition is sometimes referred to as "decomposing bacteria" or merely as "bacteria".

The treatment with the microorganism is preferably a commonly employed activated sludge treatment, a treatment with a microorganism capable of decomposing the difficultly biodegradable compounds, or a combination of these treatments.

As the activated sludge treatment, any of those general-purpose activated sludge treatments may be used which are described in detail in books such as Kankyo Gijutsu Kenkyukai; *Gesui-Haisui-Odeishori Handbook*, section 2, chapter 3 (Riko Sinsho; published in 197).

<Specific Microorganism>

The specific microorganism to be used in the invention is a microorganism which can decompose at least an aminopolycarboxylic acid.

Examples of the specific microorganism having the ability of decomposing an aminopolycarboxylic acid such as a metal chelate (e.g., EDTA) and a heavy metal chelate wherein the metal chelating agent forms a complex bond with a heavy metal include those bacteria which belong to the genus *Bacillus*, such as *Bacillus editabidus, Bacillus subtilis, Bacillus megaterium* and *Bacillus sphaericus*. These are easily available as, for example, *Bacillus edtaidus*-1 (FERM P-13449), *Bacillus subtilis* NRIC 0068, *B. megaterium* NRIC 1009, and *B. sphaericus* NRIC 1013.

As other specific microorganism having the ability of decomposing EDTA, there are illustrated bacteria belonging to the genus *Pseudomonas* and the genus *Alkaligenes* described in JP-A-58-43782, the genus *Agrobacterium* described in Applied and Environmental Microbiology vol. 56, p. 3346–3353(1990) and Gram-negative isolate described in Applied and Environmental Microbiology vol. 58, No. 2, February 1992, pp. 671–676. Of these, for example, *Pseudomonas editabidus* is available as *Pseudomonas editabidus*-1 (FERM P-13634).

As further specific microorganism having the ability of decomposing EDTA, there are illustrated marine bacteria of *Bacillus editabidus* and *Mesophilobacter editabidus*. This organic aminocarboxylic acids-decomposing bacterium, *Bacillus editabidus* is a species to which *Bacillus editabidus*-M1 (FERM P-14868) and *Bacillus editabidus*-M2 (FERM P-14869) belong. Also, organic aminocarboxylic acids-decomposing bacteria, *Mesophilobacter editabidus* is a species to which *Mesophilobacter editabidus*-M3 (FERM P-14870) belongs.

Additionally, as the specific microorganism to be used, those which are newly screened from soils such as soils in touch with wastewater from a place where aminopolycarboxylic acids are produced or handled may be utilized depending upon the purpose, and the microorganism may be a mixture of plural strains. Additionally, those which are newly screened may be used without identification.

<Embodiment of Treating with Microorganism>

In the invention, the treatment with microorganism of the organic wastewater using the specific microorganism may be either a method of treating an electrolytically oxidized organic wastewater with the above-described specific microorganism alone or a method of a combination of the treatment with the specific microorganism and the treatment with the activated sludge. In the case of the combined treatment, the activated sludge to be used may be any of generally used ones, and is not necessarily a specific standard sludge. For example, there may be used a sludge obtained by adapting a returned sludge obtaqined from a terminal plant for treating city sewage or from a terminal wastewater-treating plant in a factory or other large facilities with the wastewater to be treated. With organic wastewaters containing biodegradable compounds in addition to the difficultly biodegradable compounds such as aminopolycarboxylic acids, the latter combined treatment is particularly effective.

<Embodiment of the Combined Treatment Wherein the Treatment with the Specific Microorganism is Combined with the Treatment with Activated Sludge>

The combined treatment wherein the treatment with the specific microorganism is combined with the treatment with activated sludge is further described. Although the specific microorganism decomposes the difficultly decomposable compounds such as aminopolycarboxylic acids, decomposition of the specific compounds do not proceed when the specific microorganism is merely added to a conventional activated sludge tank, because microorganisms already existing in the activated sludge tank act so dominantly that activity of the specific microorganism is restricted. The inventors have found the conditions under which the specific microorganism capable of decomposing difficultly biodegradable compounds can coexist with the activated sludge microorganism in an activated sludge tank in such a state that both can exhibit their functions. Such coexisting conditions are one, or a combination, of (1) optimization of concentrations and concentration ratio of both microorganisms, (2) selection of the stage of adding the specific microorganism, (3) employment of an embodiment of supporting the specific microorganism on a carrier so as to maintain its activity and, especially, (4) employment of inclusive immobilization.

As to condition (1), the optimal ranges of the concentrations and concentration ratio of the both microorganisms change depending upon kind of the specific microorganism, kind of the specific compound and property of wastewater and, therefore, the condition is selected with each case.

Generally, the specific microorganism is contained in a dry weight amount of about 10 g to about 50 kg, preferably about 20 g to about 5000 g, per 1 $m^3$ of wastewater. Also, microorganism in the activated sludge is contained in a commonly employed concentration.

The ratio in number of the microorganism in the activated sludge to the specific microorganism is 0.005 to 200 in a place where both of the microorganisms co-exist and, in many cases, 0.05 to 20, more preferably 0.1 to 10.

The treating method (2) of selecting the stage of adding the specific microorganism is a method suited for a treating tank system wherein the activated sludge tank forms a flow path starting from a wastewater inlet and ending up at an outlet for the treated wastewater (including a composite treating tank system wherein two or more tanks are connected to each other to successively treat the wastewater). This method is a method of decomposing biodegradable compounds by the microorganism in the activated sludge and fully effecting decomposition of the specific compound by adding the specific microorganism in the course of the progress of wastewater treatment (specifically, in the case of using the composite treating tank system, the specific microorganism being added to a second or more subsequent tank) utilizing the fact that activation of the sludge microorganism is vigorous in the first stage of the activated sludge treatment and, with the progress of biodegradation, its activity gradually decreases.

The invention does not exclude an embodiment of directly adding the specific microorganism to the activated sludge tank. However, as an embodiment of (3) which ensures sustained activity of the specific microorganism, a method of adding the specific microorganism in the form of being supported on a carrier is more effective. In supporting the specific microorganism, the supporting may be effected by mere adsorption to the surface of a carrier, but it is more advantageous to support on an immobilizing carrier. That is, use of the immobilizing carrier serves to enhance activity of the microorganism and shorten the time necessary for the decomposition and, therefore, this embodiment is a more preferred embodiment.

Especially, an embodiment (4) of inclusively immobilizing the microorganism for the addition serves to stabilize and enhance activity of the microorganism. As specific methods of (3) and (4), there may be employed various known methods.

The method of the invention of treating wastewater enables one to greatly reduce a high COD value of an organic wastewater of, specifically, from 100 to several ten thousands of ppm to a 50% level thereof or to about several ppm, by the electrolytic oxidation treatment and the biological treatment with the specific microorganism, or by the electrolytic oxidation treatment and the biological treatment with a combination of the specific microorganism and the activated sludge.

<Carrier for Supporting the Specific Microorganism and Supporting Method>

Next, the carrier for supporting the specific microorganism and the supporting method referred to in (3) and (4) above are described below.

As a carrier for supporting the microorganism, any of known materials may be used that can support the specific microorganism and permits addition to a polluted soil. However, in view of effective supporting of useful microorganism, those to which surface the microorganism strongly adsorbs, those which have a porous structure allowing the microorganism to invade thereinto to thereby enhance retention power, and those which are formed by agglomerated microscopic particles and have an substantially increased adsorption or occlusion surface area are desired.

Specifically, there are illustrated polysaccharides such as cellulose, dextran and agarose; non-active proteins such as collagen, gelatin and albumin; synthetic high-molecular compounds such as ion-exchange resin and polyvinyl chloride; inorganic materials such as ceramics and porous glass; natural carbohydrates such as agar, alginic acid and carrageenan; and high-molecular compounds capable of functioning as an inclusive carrier such as cellulose acetate, polyacrylamide, polyvinyl alcohol, epoxy resin, photo-curable resin, polyester, polystyrene and polyurethane. Further, lignin, starch, chitin, chitosan, filter paper, wood piece, etc. may also be utilized.

Of the embodiments of supporting and immobilizing the specific microorganism, a supporting embodiment wherein the specific microorganism is taken in the carrier material is particularly preferred.

Preferred form of the carrier includes an almost spherical form, an almost cubic form, an almost rectangular parallelepiped form, a cylindrical form and a tubular form, with an almost spherical form which is easily producible or an almost parallelepiped form which provides a large specific area being particularly preferred. As processes for producing the carriers, any of known processes may be employed. For example, there are illustrated a process of dropwise adding a mixed solution of the microorganism and the carrier (or a precursor thereof) to a liquid which does not dissolve them to thereby solidify the liquid droplets and form a dispersion of microorganism-supporting carrier particles; a process of solidifying the mixed solution of the microorganism and the carrier (or a precursor thereof) by lowering the temperature or by adding a gelling agent or a solidifying agent, and cutting the solidified product into pieces of a proper size to thereby obtain parallelepiped particles supporting thereon the microorganism; a process of injecting the mixed solution of the microorganism and the carrier (or a precursor thereof) into a liquid which does not dissolve them through an extrusion nozzle to solidify in the liquid and form filament-like solidified product supporting the microorganism, and suitably cutting the product to obtain cylindrical particles; and a process for obtaining microorganism-supporting tubular carrier particles by using a ring-shaped die for the extrusion molding in the above-described method.

The advantage of the inclusive immobilizing methods is that slowly proliferating microorganisms can be immobilized, because microorganism cells can be immobilized in such a high concentration that treating efficiency can be improved. Also, immobilization of microorganism serves to increase resistance of the microorganism against changes in conditions such as pH and temperature and against a high load. As methods for the inclusive immobilization, any method may be employed that can enclose microorganism with keeping the activity of the microorganism in the carrier and that has a large physical strength and resistance against a long-time use. Examples of such methods include an acrylamide method, an agar-acrylamide method, a PVA-boric acid method, a PVA-freezing method, a method of using a photo-curing method, an acrylic synthetic resin method, a sodium polyacrylate method and a K-carrageenan method.

The most general method is a method of immobilizing microorganism in a water-containing gel of a synthetic high polymer. As a specific method for immobiloizing the microorganism in the water-containing gel, there are illustrated a method of forming a carrier by mixing seed sludge with a carrier solution or a carrier precursor solution, then dropwise adding the mixture to a fixing solution or a solution of a cross-linking agent, a method of molding in a mold before immobilization, and a method of molding after immobilization. By these forming or molding methods, the carriers are formed into pellets of a spherical, cylindrical, cubic or parallelepiped form. In this occasion, the surface of the carrier may be made uneven. The particle size of the pellets is preferably about 0.1 to about 5 mm. In case where the particle size is smaller than 0.1 mm, solid-liquid separation of the carrier and the treated solution becomes difficult whereas, in case where the particle size is larger than 5 mm, oxygen fails to distribute into the interior of the carrier, and, thus, it becomes difficult for microorganism cells in the interior of the carrier to live there.

As the high-molecular water-containing gel to be used, natural organic high-molecular substances such as polysaccharides (e.g., carrageenan, alginic acid and ethylsuccinyl cellulose) and collagen, synthetic high-molecular resins such as polyethylene glycol prepolymer (PEG) and polyacrylamide, and any high-molecular substance may be used that can solidify at an ordinary temperature or at a temperature at which microorganism does not die out and, after solidification, does not release the microorganism into a liquid.

As a typical example of the method for inclusively immobilizing microorganism to the water-containing gel, a method for preparing a microorganism-immobilizing gel according to the acrylamide method is described below. The gel having immobilized therein microorganism is obtained by suspending bacteria cells (concentrated to about MLSS 20,000 ppm) in an acrylamide monomer solution containing a cross-linking agent (such as N,N'-methylenebisacrylamide), adding thereto a polymerization accelerator (such as N,N,N',N'-tetramethylethylenediamine) and a polymerization initiator (such as potassium persulfate), polymerizing at 20° C. in a mold such as a 3-mm Ø vinyl chloride-made tube and, after completion of the polymerization, taking the polymerization product out of the mold, then cutting into a definite length. Since size of pores on the surface of the immobilizing gel is smaller than the size of bacteria, the inclusively immobilized bacteria cells difficultly leak out of the pores and proliferate in the interior of the gel to conduct self-decomposition. A polluting component in the soil alone invades into the interior of the gel and is treated by the bacteria there.

The method for immobilizing microorganism in a synthetic high-molecular, water-containing gel is also disclosed in JP-A-10-263575.

As another inclusively immobilizing method, there is illustrated a method of immobilizing on active carbon particles.

As the active carbon to be used, there may be illustrated those which are manufactured from charcoal, coal, coke, coconut shell, resin or petroleum pitch. Active carbons obtained by activating these various starting carbides such as wood-derived, coal-derived, resin-derived or pitch-derived carbides through a gas-activating method, a steam-activating method, or a chemically activating method using zinc chloride or phosphoric acid are preferred. Above all, wood-derived active carbon is preferred because it has a network structure on the surface and the inside thereof wherein microorganisms can live easily and which has an excellent ability of adsorbing organic substances and an odor component and has an excellent mechanical strength. Active carbon obtained by chemically activating wood-derived active carbon is more preferred.

The active carbon has a packing density of 0.10 to 0.70 g/cc, preferably 0.15 to 0.60 g/cc, a specific surface area of 300 to 2800 $m^2$/g, preferably 600 to 2500 $m^2$/g, and a pore volume of pores having a pore radius of 10 nm to 500 μm of 0.1 to 2.5 ml/g, preferably 0.15 to 2.5 ml/g. The particle size of the active carbon is practically and preferably 0.1 to 8 mm, because too small-sized particles make it difficult to conduct solid-liquid separation of the treated wastewater, whereas too large-sized particles have a small contact area with a wastewater to be treated.

The method of immobilizing microorganism in active carbon particles is also disclosed in JP-A-11-77074.

As a still further method for inclusively immobilizing microorganism, there is a method of immobilizing the specific microorganism in carbon fiber-made cloth. The carbon fibers to be used as a carrier are fibers obtained by, for example, melt spinning coal pitch and carbonizing the product. It is preferred to use carbon fiber-made cloth of 0.3 to 6.0 mm in thickness and 20 to 300 g/$m^2$ in unit weight composed of carbon fibers of 1 to 30 μm in diameter.

Use of the carbon fiber-made cloth enables to prepare a carrier which assures a long life of the specific microorganism within the activated sludge tank and increase the amount of the microorganism per unit area, thus serving to improve the efficiency of biologically treating the specific compound.

The diameter of carbon fibers of the carbon fiber-made cloth forming the carrier for the microorganism, a bonding material used therein, and the thickness and unit weight of the cloth may properly be selected taking into consideration the amount of deposited microorganism, ease of wastewater to be treated to flow and ease of preparation of the carrier for microorganism. For example, carbon fiber cloth of 0.3 to 6.0 mm in thickness and 20 to 300 g/m2 in unit weight comprising carbon fibers of 1 to 30 μm can form a carrier for microorganism which does not suffer deterioration of strength even after long-term use and is suited as a fixed bed in a biologically treating tank.

As to these methods for carrying, particularly immobilizing, microorganism, descriptions are given in *Biseibutsu Koteikahou Niyoru Haisuishori* compiled by Ryuichi Sudo (Sangyo-yosui Chosakai), *Seibutsumakuhou Niyoru Haisuishori No Kodo-kouritsuka No Doukou* written by Yuhei Inamori, *Suishitsu Odaku Kenkyu*, vol. 13, No. 9, 1990, pp. 563–574, *Kodo Mizushsori Gijutsu Kaihatsu No Doko•Kadai•Tenbo* written by Yuhei Inamori, and *Yosui To Haisui*, vol. 34, No. 10, 1992, pp. 829–835.

As the carrier for the microorganism, a biological preparation for soil purification of Biotrack DOL, or a preparation of SurfClean (both being products of Saiburon Chemicals Nippon K.K.) may be used.

<Operation of Treating Wastewater Using a Specific Microorganism>

As to manner of adding the specific microorganism, any manner may be employed as long as the microorganism cells can be uniformly dispersed in the treating tank in the case of a non-flow path type treating tank or as long as the cells can be rapidly dispersed in the vicinity of the place to which they are added in the case of a flow path-forming type treating tank described in the foregoing (3) and (4). For example, the microorganism may directly manually be added from a container while introducing air into the treating tank or stirring the content by means of a stirrer.

With either a single tank-containing, non-flow path type tank for treating a wastewater or a plural tanks-containing, flow path type treating tank, the whole volume of the tank or tanks and the residence time, which may differ depending upon the amount of wastewater, are generally adjusted so that the residence time of the wastewater becomes about 0.2 day to about 20 days, particularly preferably about 0.5 day to about 5 days.

Also, with a plural tanks-containing treating tank, the number of tanks is not particularly limited but, in view of efficiency and apparatus cost, 2 or 3 tanks are preferred.

The treatment of wastewater by the use of a specific microorganism, the use of activated sludge or a combination thereof is controlled by measuring pH, DO (dissolved oxygen) and COD values before and after the treatment. PH is 4.0 to 8.5, preferably 4.5 to 8.0, with narrower range for the control being selected depending upon properties of the wastewater. DO is 5.0 mg/l to 15.0 mg/l, preferably 7.0 mg/l to 13.0 mg/l. The pH can be controlled by adding an acid or an alkali, and DO by adjusting the amount of air to be introduced.

The concentration of aminopolycarboxylic acid can be directly measured but, as a practical controlling method, it is practical to use COD as a value corresponding to the concentration. Measurement of COD is conducted by preferably measuring both COD at the inlet of the microorganism-treating tank and COD at the outlet of the tank (in the case where a plurality of tanks are provided, the outlet of the final tank). However, when the treatment of wastewater is in a stable state, it is possible to measure only COD at the outlet of the treating tank.

In the case of monitoring the state of operation of the wastewater treatment, examples of an apparatus for measuring the COD value include commercially available OD-1000/1100 made by Kabushiki Kaisha COS, CODA-211/212 made by HORIBA, and Hiranuma fully automatic COD-measuring apparatus made by Hitachi High Technologies. However, the apparatuses are not limited only to these, and any general-purpose apparatus can be used that can measure the COD value.

To the microorganism-containing treating tank may be added, as needed, proper amounts of nutrition sources to maintain the activity of the microorganism in wastewater and the specific microorganism depending upon the state of activity thereof.

The nutrition sources are composed of carbon sources, nitrogen sources or organic nutrition sources of inorganic salts, suitable for the growth of the microorganisms. Polypeptone, yeast extract, meat extract and molasses are added as the organic nutrition source, and various phosphates and magnesium salts are added as the inorganic nutrition sources. The organic nutrition sources are added in an amount of 0.001 to 5% by weight, preferably 0.01 to 1% by weight, of the amount of wastewater, and the inorganic nutrition sources are added in an amount of about 0.1 to 1% by weight of the organic nutrition sources. The amounts are not limitative, and proper amounts may be selected depending upon properties and state of wastewater.

Manner of adding the nutrition sources is not particularly limited as long as they can be uniformly dispersed within the treating tank. For example, in the case of adding the nutrition sources in the form of an aqueous solution, the addition is effected by adding the aqueous solution from a solution tank or vessel by means of a feeding pump or manually under introducing air or stirring with a stirrer and, in the case of adding as solids such as powder, they can be thrown into the tank through an introducing hopper or a conveying device.

Also, it is possible to incorporate the nutrition substances in a gel-like inclusive carrier such as carrageenan or alginic acid to exhibit a sustained-release effect. As such method, there is a method of 1) mixing a solution containing the nutrition substances with a gelling agent (carrageenan or alginic acid), then conducting gelation and formation of a carrier to obtain a microorganism-supporting carrier.

In the case where activity of the specific microorganism within the microorganism-containing, treating tank becomes decreased, it is desirable to add the nutrition sources and monitor change in COD value for several days and, when the degree of decrease in the activity is not restored, add the microorganism. In case where the degree of decrease in COD value is not restored despite the addition of the microorganism, some troubles might have taken place. A system permitting dilution and discharge as emergency countermeasure is desirable. During such emergency countermeasure, the cause of decrease in activity of the microorganism can be analyzed and a proper countermeasure can be worked out.

EXAMPLES

The invention is now illustrated in more detail by reference to the following examples. However, the invention should not be construed as being limited to these examples.

Example 1

<Chemical Plating Waste Liquor>

As a wastewater sample containing an aminopolycarboxylic acid for test, a chemical plating waste liquor obtained from a chemically copper-plating factory in the city was used. Formulation of this waste liquor was as follows.

| | |
|---|---|
| COD | 2000 ppm |
| Cu | 220 ppm |
| EDTA | 880 ppm |
| Formaldehyde | 1500 ppm |
| pH | 9.5 |

<High-speed Electrolytic Oxidation Treatment>

This sample waste liquor was placed in a batchwise electrolytic tank having a charge capacity of 80 L of the waste liquor in an ultra-high-speed electrolytic oxidation treatment apparatus of BC Nine Model 801 (made by Japan Techno Co., Ltd.), and electricity was applied under the following conditions to conduct electrolytic oxidation. In the electrolytic oxidation, the vibration frequency was 40 cycles/sec.

| | |
|---|---|
| Anode | lead dioxide (commercially available) |
| Cathode | stainless steel plate (SUS316) |
| Anode-to-cathode distance | 20 mm |
| Electrolysis aid (BC Crean #105; made by Nihon Tekuno K.K.) | 6.0 Kg |
| Adjustment of pH | 100 mL of sulfuric acid |
| Electric current | 650 A |
| Voltage | 5.5 V |
| Electrolysis temperature | 76° C. |

The reaction solution was sampled in the course of the electrolytic oxidation to measure COD and the amount of EDTA.

Results of the electrolytic oxidation treatment are shown in Table 1.

TABLE 1

| Electrolysis Time (hr) | COD | EDTA |
|---|---|---|
| 0 | 20000 | 620 |
| 1 | 17500 | 540 |
| 2 | 16000 | 380 |
| 4 | 9000 | 0 |
| 6 | 5000 | 0 |
| 8 | 4000 | 0 |
| 10 | 3000 | 0 |

Units:
COD in ppm,
EDTA in mg/L

After conducting the electrolytic oxidation treatment for 4 hours, the amount of EDTA in the wastewater became a non-detectable level, and COD was decreased to 50% or less. For comparison, the sample waste liquor was subjected to electrolytic oxidation under substantially the same conditions according to a conventional method using an electrolyzing apparatus described in Example 1 of JP-A-4-244299, and the COD value was found to be 600 ppm even after 10-hour treatment.

Example 2

<Acclimatization and Culture of Microorganism>

500 ml of the following culture medium containing a copper complex of EDTA was sterilized at 120° C. for 20 minutes in an autoclave, and the medium was inoculated with the following strain, followed by conducting static cultivation.

| | |
|---|---|
| Polypeptone | 0.5% |
| Yeast extract | 0.1% |
| Cu-EDTA | 0.01% |
| 1/30M phosphate buffer | 500 ml |
| pH | 6.0 |

Cell strain: *Bacillus editabidus*-1 (FERM-P 13449)

<Chemical Plating Waste Liquor>

As a wastewater sample containing an aminopolycarboxylic acid for test, the same chemical plating waste liquor obtained from a chemically copper-plating factory in the city as used in Example 1 was used.

<High-speed Electrolytic Oxidation Treatment>

Electrolytic oxidation was conducted using the same high-speed electrolytic oxidation treating apparatus of BC Nine Model 801 (made by Nihon Tekuno K.K.) as used in Example 1.

<Treatment with Microorganism>

Batchwise biological treatment was conducted by taking out each time 1 liter of the reaction solution in the course of the electrolytic oxidation. That is, bacteria cells (800 mg in dry weight) acclimatized in the above-described 0.1% CU-EDTA medium were added to a 2-liter, batchwise biologically treating tank, and the reaction solution taken out was poured into the tank and, after introducing air thereinto for 8 hours, COD and the amount of EDTA were measured. Measurement of the amount of EDTA was conducted according to the ion chromatography described in Nihon Shasin Gakkai-shi, vol. 58, p. 105 (1995).

Results of the electrolytic oxidation and the subsequently conducted biological treatment are shown in Table 2.

TABLE 2

| Electrolysis Time (hr) | COD | EDTA | COD after biological | EDTA after biological |
|---|---|---|---|---|
| 0 | 20000 | 620 | 17000 | 180 |
| 1 | 17500 | 540 | 15000 | 110 |
| 2 | 16000 | 380 | 1800 | 0 |
| 4 | 9000 | 0 | 600 | 0 |
| 6 | 5000 | 0 | 400 | 0 |
| 8 | 4000 | 0 | 100 | 0 |
| 10 | 3000 | 0 | 60 | 0 |

Units:
COD in ppm,
EDTA in mg/L

It is seen from the results in Table 2 that COD component (supposed to be a decomposition product of EDTA) which still remained after decomposition of a component determined as EDTA was decomposed by the decomposition treatment with the microorganism to decrease the COD value, thus the combination of the electrolytic oxidation treatment and the treatment with microorganism being effective.

Example 3

The same wastewater treatment composed of a combination of the electrolytic oxidation treatment and the microorganism treatment as in Example 2 was conducted except that the acclimatized microorganism used in Example 2 was supported on a high polymer carrier (Biotube made by Shin-nihon Seitetsu) to use. (The amount of added bacteria cells was adjusted to be 800 mg in dry weight as in Example 1). The amount of the carrier added was 50 times as much as the amount of the baceteria cells.

The amount of EDTA and the value of COD were measured in the same manner as in Example 2, and the results are shown in Table 3.

TABLE 3

| Electrolysis Time (hr) | COD | EDTA | COD after biological treatment | EDTA after biological treatment |
|---|---|---|---|---|
| 0 | 20000 | 620 | 15500 | 150 |
| 1 | 17500 | 540 | 13500 | 80 |
| 2 | 16000 | 380 | 1500 | 0 |
| 4 | 9000 | 0 | 480 | 0 |
| 6 | 5000 | 0 | 150 | 0 |
| 8 | 4000 | 0 | 80 | 0 |
| 10 | 3000 | 0 | 70 | 0 |

Units:
COD in ppm,
EDTA in mg/L

By comparing the results in Table 3 with the results of Example 2 (in Table 2), it is seen that this experiment wherein the microorganism was supported on an immobilizing carrier enables to more effectively decrease COD than the method shown in Example 2 wherein the microorganism was directly added to the biodegradation tank.

Example 4

The same experiment as in Example 2 was conducted except for changing the bacteria strain to the following. Bacteria strain: *Pseudomonas editabidus*-1 (FERM-P 13634).

The test results revealed that the COD-decreasing rate and the EDTA-decreasing rate were about the same as in Example 2. Therefore, it is seen that the method of the invention for treating an organic wastewater provides good results regardless of the kind of strain.

Example 5

Electrolytic treatment was carried out under the same conditions and by the same method as in Example 1 except that four kinds of wastewater samples of different pH's were prepared by adjusting the pH of the wastewater sample used in Example 1 to 6.0, 6.5, 11.0 or 11.5 with use of sodium hydroxide or sulfuric acid and used for testing.

The test results are shown in Table 4.

TABLE 4

| Duration of electrolysis | pH 6.0 | | pH 6.5 | | pH 11.0 | | pH 11.5 | |
|---|---|---|---|---|---|---|---|---|
| | COD | EDTA | COD | EDTA | COD | EDTA | COD | EDTA |
| 0 | 2000 | 620 | 2000 | 620 | 2000 | 620 | 2000 | 620 |
| 1 | 19400 | 600 | 18300 | 580 | 18100 | 570 | 19100 | 590 |
| 2 | 18500 | 590 | 17900 | 420 | 17600 | 400 | 18200 | 510 |
| 4 | 16900 | 510 | 11800 | 20 | 11000 | 10 | 16600 | 490 |
| 6 | 15700 | 430 | 6000 | 0 | 5900 | 0 | 15400 | 380 |
| 8 | 14800 | 370 | 4600 | 0 | 4500 | 0 | 14300 | 330 |
| 10 | 13600 | 300 | 3400 | 0 | 3300 | 0 | 13200 | 280 |

Unit: hours for duration of electrolysis; mg/L for COD and EDTA

The test results in Table 4 show that the diminishing speed of COD as well as that of EDTA is higher for the pH of the wastewater samples with pH of 6.5 to 11.0, and that, when the pH value falls outside this range deviating either to the higher side or to the lower side, the electrolytic effect lowers.

The method of the invention for treating an organic wastewater containing aminopolycarboxylic acids by subjecting the organic wastewater to the high-speed electrolytic oxidation treatment provides a high oxidation rate (COD-decreasing rate) and a high decomposition ratio not obtained by the conventional electrolytic oxidation treatment. In addition, oxidation at such a high rate and decomposition at such a high ratio permit to conduct the treatment in a shorter time at a lower cost. In particular, combination of the high-speed electrolytic oxidation treatment and the treatment with the microorganism provides effects of much more decreasing COD.

The entire disclosure of each and every foreign patent application: Japanese Patent Applications No. 2002-240608 and No. 2003-271386, from which the benefit of foreign priority has been claimed in the present application is incorporated herein by reference, as if fully set forth.

What is claimed is:

1. A method for treating an organic wastewater containing an aminopolycarboxylic acid, which comprises:
   subjecting the organic wastewater to an electrolytic oxidation treatment by vibrating the organic wastewater at a frequency of 10 cycles/sec to 100 cycles/sec; and
   treating the organic wastewater with a microorganism,
   wherein the aminopolycarboxylic acid is at least one selected from the group consisting of ethylenediaminetetraacetic acid (EDTA), 1,3-propylenediaminetetraacetic acid (PDTA) and diethylenetriaminepentaacetic acid (DTPA).

2. The method for treating an organic wastewater containing an aminopolycarboxylic acid as described in claim 1, wherein the electrolytic oxidation treatment is conducted by vibrating a vibrating plate dipped in the organic wastewater to thereby stir the organic wastewater at a high speed.

3. The method for treating an organic wastewater containing an aminopolycarboxylic acid as described in claim 2, wherein the vibrating plate is a composite vibrating plate constituted by arranging a plurality of vibrating plate units.

4. The method for treating an organic wastewater containing an aminopolycarboxylic acid as described in claim 3, wherein the vibrating plate units have a gap of 1 to 200 mm.

5. The method for treating an organic wastewater containing an aminopolycarboxylic acid as described in claim 3, wherein the vibrating plate units have a gap of 2 to 150 mm.

6. The method for treating an organic wastewater containing an aminopolycarboxylic acid as described in claim 3, wherein the vibrating plate units have a gap of 3 to 100 mm.

7. The method for treating an organic wastewater containing an aminopolycarboxylic acid as described in claim 2, wherein the vibrating plate has an area of one side of $1/1000$ to $1/5$ of a cross sectional area of an electrolytic oxidation tank.

8. The method for treating an organic wastewater containing an aminopolycarboxylic acid as described in claim 2, wherein the vibrating plate has an area of one side of $1/50$ to $1/5$ of a cross sectional area of an electrolytic oxidation tank.

9. The method for treating an organic wastewater containing an aminopolycarboxylic acid as described in claim 2, wherein the vibrating plate is a metal plate having a thickness of $1/100$ to $1/5$ of a longer side, or the vibrating plate is a resin plate having a thickness of $1/50$ to $1/5$ of the longer side.

10. The method for treating an organic wastewater containing an aminopolycarboxylic acid as described in claim 1, which comprises adjusting the pH of the organic wastewater at 6.5 to 11.0 to subject the adjusted organic wastewater to the electrolytic oxidation treatment.

11. The method for treating an organic wastewater containing an aminopolycarboxylic acid as described in claim 1, wherein the microorganism is a microorganism capable of decomposing a difficultly biodegradable compound.

12. The method for treating an organic wastewater containing an aminopolycarboxylic acid as described in claim 1, wherein the organic wastewater having been subjected to the electrolytic oxidation treatment has an aminopolycarboxylic acid in an amount of 1.5 mmol/L or less, and is further subjected to the treatment with the microorganism.

13. The method for treating an organic wastewater containing an aminopolycarboxylic acid as described in claim 1, wherein the microorganism is supported on a carrier.

14. The method for treating an organic wastewater containing an aminopolycarboxylic acid as described in claim 1, wherein the aminopolycarboxylic acid is present in form of an organic aminocarboxylic acid chelate with a metal ion.

15. The method for treating an organic wastewater containing an aminopolycarboxylic acid as described in claim 1, wherein the organic wastewater is an industrial wastewater discharged from a paper pulp industry, photographic industry, textile industry, plating industry or cosmetic industry, or is agricultural wastewater.

16. The method for treating an organic wastewater containing an aminopolycarboxylic acid as described in claim 1, wherein the organic wastewater containing an aminopolycarboxylic acid is a wastewater of electrolytic plating or non-electrolytic plating.

17. The method for treating an organic wastewater containing an aminopolycarboxylic acid as described in claim 1, wherein the vibrating is performed at 15 cycles/sec to 80 cycles/sec.

18. The method for treating an organic wastewater containing an aminopolycarboxylic acid as described in claim 1, wherein the vibrating is performed at 20 cycles/sec to 60 cycles/sec.

* * * * *